United States Patent
Guillou et al.

(10) Patent No.: US 7,680,271 B2
(45) Date of Patent: Mar. 16, 2010

(54) ZERO-KNOWLEDGE PROOF CRYPTOGRAPHY METHODS AND DEVICES

(76) Inventors: Louis Guillou, 16 rue de l'Ise, Bourgbarre (FR) 35230; Jean-Jacques Quisquater, 3 avenue des Canards, Rhode Saint-Genese (BE) B 1640

( * ) Notice: Subject to any disclaimer, the term of this patent is extended or adjusted under 35 U.S.C. 154(b) by 637 days.

(21) Appl. No.: 10/587,460

(22) PCT Filed: Jan. 24, 2005

(86) PCT No.: PCT/FR2005/000158

§ 371 (c)(1),
(2), (4) Date: Jul. 24, 2006

(87) PCT Pub. No.: WO2005/081452

PCT Pub. Date: Sep. 1, 2005

(65) Prior Publication Data

US 2007/0121936 A1    May 31, 2007

(30) Foreign Application Priority Data

Jan. 23, 2004    (FR) .................................. 04 50129

(51) Int. Cl.
*H04L 9/00*    (2006.01)
*H04L 9/30*    (2006.01)
(52) U.S. Cl. .......................................... 380/30; 380/44
(58) Field of Classification Search .................. None
See application file for complete search history.

(56) References Cited

FOREIGN PATENT DOCUMENTS

FR    2 788 912 A    7/2000
WO    WO 00/45550 A    8/2000
WO    WO 02/073876 A    9/2002

OTHER PUBLICATIONS

Guillou L.C. et al. "Cryptographic Authentication Protocols for Smart Cards." Computer Networks, Elsevier Science Publishers B.V., Amsterdam, NL vol. 36, No. 4, Jul. 16, 2001, pp. 437-451.*
Guillou et al., "Cryptographic authentication protocols for smart cards", Computer Networks, Elsevier Science Publishers B.V., Amsterdam, NL, vol. 36, No. 4, pp. 437-451, Jul. 16, 2001.
Gardner M., "A new kind of cipher that would take millions of years to break", Scientific American, Aug. 1977, pp. 120-124.
Goldwasser S., et al., "The Knowledge Complexity of Interactive Proof Systems", 17th ACM Symposium on the Theory of Computing, pp. 291-304, 1985.
Feige, U., et al., "Zero Knowledge Proofs of Identity", Journal of Cryptology, vol. 1, pp. 77-94, 1988.

* cited by examiner

*Primary Examiner*—Kaveh Abrishamkar
(74) *Attorney, Agent, or Firm*—Schwabe, Williamson & Wyatt, P.C.

(57) ABSTRACT

A cryptography method involving a keyholder having a number $m \geq 1$ of private keys $Q_1, Q_2, \ldots, Q_m$ and respective public keys $G_1, G_2, \ldots, G_m$, each pair of keys $(Q_i, G_i)$ (where $i = 1, \ldots, m$) satisfying either the relationship $G_i = Q_i^v$ mod n or the relationship $G_i \times Q_i^v = 1$ mod n, where n is a public integer equal to the product of f (where $f > 1$) private prime factors $p_1, \ldots, p_f$, at least two of which are separate, and the exponent v is a public integer equal to a power of 2. Disclosed is what mathematical structure may be imparted to the public keys for it to be impossible to calculate said private keys from said public parameters in a reasonable time unless said prime factors are known. Devices adapted to implement the method are also disclosed.

20 Claims, No Drawings

ZERO-KNOWLEDGE PROOF CRYPTOGRAPHY METHODS AND DEVICES

This is a national stage of application No. PCT/FR2005/000158, filed on 24 Jan. 2005.

FIELD OF THE INVENTION

The present invention relates to asymmetrical key cryptography, also known as public key cryptography. It relates more precisely to a method and a system for verifying the authenticity of a known entity or a message coming from a known entity or for signing a message.

BACKGROUND OF THE INVENTION

Asymmetrical key cryptography systems use pairs of keys, each pair comprises a public key and a private key, and each key may include a number of parameters. Each public key is linked to the identity of its holder by a certification authority. Asymmetrical key cryptography systems include entities known as controllers that store a number of public keys in conjunction with the certified identities of their holders.

The problem of factorizing integers has been the subject of intense research since the invention of the RSA asymmetrical key cryptographic method (see the article by M. Gardner, "A new kind of cipher that would take millions of years to break", Scientific American, August 1977). The name RSA of the algorithm is derived from the initials of its inventors R. Rivest, A. Shamir, and L. Adleman. Despite considerable advances, more a result of growth in computing power than of progress in factorizing algorithms, there is still no known method of factorizing a large integer in a reasonable time. Users are therefore justified in placing their trust in the RSA method.

Each use of the RSA method is associated with an integer n known as the modulus and which is the product of two separate large prime factors $p_1$ and $p_2$. Given present-day computing capacities, it is recommended that moduluses of at least 1024 bits (of the order of $10^{308}$) are used. An RSA public key includes the modulus n and an exponent e that is prime with ($p_1-1$) and with ($p_2-1$). The corresponding RSA private key includes an exponent d such that (the symbol "mod" signifies "modulo"):

$$e \times d = 1 \mod[(p_1-1)(p_2-1)]$$

The security of this method relies on the fact that it is impossible to calculate d from n and e within a reasonable time if the factors $p_1$ and $p_2$ are not known. As explained above, it is not possible to calculate these factors (which are naturally kept secret) in a reasonable time.

The cryptographic procedure for entity authentication uses a controller and a keyholder, referred to below as the claimant, who wishes to be authenticated by the controller in order to receive an authorization, for example the authorization to access electronic data processing resources. The claimant declares an identity to the controller, and must prove to the controller that the claimant holds the private key corresponding to the public key linked to that identity.

It is possible to effect this authentication without the claimant disclosing to the controller any information at all concerning the claimant's private key: this technique is known as zero-knowledge proof authentication and is described in general terms by S. Goldwasser, S. Micali, and C. Rackoff in their paper "*The Knowledge Complexity of Interactive Proof Systems*" delivered at the 17th ACM Symposium on the Theory of Computing (Proceedings, 291 to 304, 1985).

In the paper "*Zero-knowledge Proofs of Identity*" (Journal of Cryptology, vol. 1, pages 77 to 94, 1988), U. Feige, A. Fiat, and A. Shamir propose a zero-knowledge proof cryptographic method in which the claimant holds a private key Q and publishes an RSA modulus n and a public key $G=Q^2 \mod n$ (it is impossible to calculate Q from G, i.e. to calculate a square root modulo n, in a reasonable time unless the prime factors of n are known).

When the above method is applied to authenticating entities, the Fiat-Shamir procedure comprises the following interactive steps:

1. Witness step: the claimant chooses at random an integer r, calculates the "witness" $R=r^2 \mod n$ and sends the witness to the controller;

2. Challenge step: the controller chooses at random an integer d called a "challenge" which can take the value 0 or the value 1 and sends the challenge to the claimant;

3. Response step: the claimant calculates the "response" $D=r \times Q^d \mod n$ and sends the response to the controller; and 4. Verification step: the controller calculates $$\left(\frac{D^2}{G^d}\right) \mod n$$

and verifies that the result is equal to the witness R.

For increased security, it is recommended that this procedure should be repeated "sequentially" as many times as possible before considering that authentication has been effected (varying r and d each time).

This is a zero-knowledge proof procedure because an observer cannot calculate the private key Q of the claimant from the data exchanged.

In a Feige-Fiat-Shamir or parallel variant, the claimant holds a number m>1 of private keys $Q_1, Q_2, \ldots, Q_m$ and publishes, in addition to an RSA modulus n, respective public keys $G_1, G_2, \ldots, G_m$, where $G_i = Q_i^2 \mod n$ for $i=1, \ldots, m$. The following steps are then executed:

1. Witness step: the claimant chooses at random an integer r, calculates the witness $R=r^2 \mod n$ and sends the witness to the controller;

2. Challenge step: the controller chooses at random m challenges $d_1, d_2, \ldots, d_m$ where $d_i$ is equal to 0 or 1 and for $i=1, \ldots, m$ and sends the challenges to claimant;

3. Response step: the claimant calculates the response $D=r \times Q_1^{d_1} \times Q_2^{d_2} \times \ldots \times Q_m^{d_m} \mod n$ and sends the response to the controller; and 4. Verification step: the controller calculates $$\left(\frac{D^2}{G_1^{d_1} \times G_2^{d_2} \times \ldots \times G_m^{d_m}}\right) \mod n$$

and verifies that the result is equal to the witness R.

This parallel variant accelerates the Fiat-Shamir authentication procedure compared to the sequential (i.e. series) variant referred to above.

Note further that the calculations required to implement either of these variants can be reduced if the claimant uses the Chinese remainder theorem well known to experts in number theory. The claimant may proceed in the following manner.

Consider first the calculation of the witness R. For a modulus $n=p_1 \times p_2$, where $p_1 < p_2$, let a number C (known as a Chinese remainder) be the positive number less than $p_1$ such that $p_1$ is a factor of ($p_2 \times C - 1$). The claimant chooses at random two integers $r_1$ and $r_2$ such that $0 < r_1 < p_1$ and $0 < r_2 < p_2$ and calculates the two witness components $R_1 = r_1^2 \mod p_1$ and $R_2 = r_2^2 \mod p_2$. The value of the witness is deduced therefrom as follows, where $z = C \times (R_1 - R_2)$:

$$R = z \times p_2 + R_2$$

To calculate the response D, the claimant may proceed as follows. Private key components $Q_{i,1}=Q_i \bmod p_1$ and $Q_{i,2}=Q_i \bmod p_2$ are defined for $i=1, \ldots, m$. The claimant first calculates the two response components:

$$D_1 = r_1 \times Q_{1,1}^{d_1} \times Q_{2,1}^{d_2} \times \ldots \times Q_{m,1}^{d_m} \bmod p_1, \text{ and}$$

$$D_2 = r_2 \times Q_{1,2}^{d_1} \times Q_{2,2}^{d_2} \times \ldots \times Q_{m,2}^{d_m} \bmod p_2.$$

The claimant then obtains the value of the response as follows, where $z = C \times (D_1 - D_2)$:

$$D = z \times p_2 + D_2$$

The advantage of this Chinese remainder calculation method is that the claimant calculates modulo $p_1$ and modulo $p_2$ instead of modulo n under conditions whereby $p_1$ and $p_2$ are generally much smaller than n.

The Fiat-Shamir entity authentication procedure may be transposed easily to verification by a controller that a message M that it has received was sent by a certain keyholder, here also called the claimant. This message authentication procedure comprises the following interactive steps:

1. Witness step: the claimant chooses at random an integer r and calculates first the witness $R = r^2 \bmod n$ and then the token $T = h(M, R)$, where h is a hashing function (for example one of the functions defined in the ISO/IEC Standard 10118-3), and finally sends the token T to the controller;

2. Challenge step: the controller chooses at random a challenge d which can taken the value 0 or 1 and sends the challenge to the claimant;

3. Response step: the claimant calculates the response $D = r \times Q^d \bmod n$ and sends the response to the controller; and 4. Verification step: the controller calculates $$h\left(M, \left(\frac{D^2}{G^d}\right) \bmod n\right)$$

and verifies that the result is equal to the token T.

Finally, the Fiat-Shamir entity authentication procedure can be transposed to define a procedure for signing a message M that is sent to a controller by a keyholder called the signatory; note that a signing procedure is not interactive in itself. The signatory holds a plurality of private keys $Q_1, Q_2, \ldots, Q_m$, where m is large compared to 1, and publishes, in addition to an RSA modulus n, respective public keys $G_1, G_2, \ldots, G_m$ where $G_i = Q_i^2 \bmod n$ and for $i=1, \ldots, m$. This signing procedure comprises the following steps (given the same names as above by analogy):

1. Witness step: the signatory chooses at random m integers $r_i$ where $i=1, \ldots, m$ and calculates first the witnesses $R_i = r_i^2 \bmod n$ and then the token $T = h(M, R_1, R_2, \ldots, R_m)$, where h is a hashing function producing a word of m bits, and finally sends the token T to the controller;

2. Challenge step: the signatory identifies the bits $d_1, d_2, \ldots, d_m$ of the token T;

3. Response step: the signatory calculates the responses $D_i = r_i \times Q_i^{d_i} \bmod n$ and sends the responses to the controller; and 4. Verification step: the controller calculates $$h\left(M, \left(\frac{D_1^2}{G_1^{d_1}}\right) \bmod n, \left(\frac{D_2^2}{G_2^{d_2}}\right) \bmod n, \ldots, \left(\frac{D_m^2}{G_m^{d_m}}\right) \bmod n\right)$$

and verifies that the result is equal to the token T.

Consider now in more detail the security of the Fiat-Shamir method. For example, in the case of the entity authentication procedure explained above, the question arises: is it possible for an impostor (i.e. an entity knowing the RSA modulus n and the public key G, but not knowing the private key Q of the entity that it is pretending to be) to fool the controller?

Note first that the challenge, although random, can take only two values: if an impostor guesses the value of the challenge thrown down by the controller during the authentication procedure correctly (and thus with a 50% chance of success), could it satisfy all the steps of the Fiat-Shamir method without being caught by the controller? The answer to this question is yes. In fact:

if the impostor guesses that the challenge will be d=0 it supplies to the controller a witness $R = r^2 \bmod n$ and a response $D = r$; and if the impostor guesses that the challenge will be d=1 it chooses any integer $l>0$ and supplies to the controller a witness $R = l^2 \times G \bmod n$ and a response $D = l \times G \bmod n$.

The Fiat-Shamir procedure therefore has a weakness, although its effect can be attenuated, as indicated above, if the procedure is repeated sequentially to render a correct series of anticipations of the challenge by an impostor as improbable as possible. It follows that, to make this authentication procedure sufficiently secure, its duration must be considerably increased.

International application WO-00/45550 discloses a cryptography method that is applicable to an entity authentication procedure, a message authentication procedure and a message signing procedure and does not suffer from this drawback. In that method, the claimant publishes not only an RSA modulus n and a public key G but also an integer (called the exponent) $v = 2^k$ where k (called the security parameter) is an integer greater than 1. Moreover, if Q is the private key of the claimant:

$$G = Q^v \bmod n \tag{1}$$

The authentication procedure of application WO-00/45550 comprises the following steps:

1. Witness step: the claimant chooses at random an integer r, calculates the witness $R = r^v \bmod n$ and sends the witness to the controller;

2. Challenge step: the controller chooses at random an integer d called the challenge, where $0 \leq d \leq 2^{k-1} - 1$, and sends the challenge to the claimant;

3. Response step: the claimant calculates the response $D = r \times Q^d \bmod n$ and sends the response to the controller; and 4. Verification step: the controller calculates $$\left(\frac{D^v}{G^d}\right) \bmod n$$

and verifies that the result is equal to the witness R.

Thus in this procedure the challenge can take $2^{k-1}$ different values (as opposed to only two values in the Fiat-Shamir method), which, for a single execution of the above succession of steps, makes correct anticipation of the challenge by an impostor increasingly improbable as the value of k increases.

This being the case, to enhance security, this procedure can of course be repeated sequentially s times and/or m pairs of keys can be used in parallel as explained above; it is then advantageous to use the Chinese remainder theorem for the calculations. In practice, because a hacker has more time to crack the code in the case of signing than in the case of authentication, it is recommended that the product [(k−1)× m×s] have a value at least equal to 40 in the case of authentication and at least equal to 80 in the case of signing.

Moreover, according to application WO-00/45550, the public key is required to satisfy the following relationship, in which g is a small integer (called the base number) greater than 1:

$$G=g^2 \bmod n \quad (2)$$

Combining the above equations (1) and (2) shows that it is necessary to find a pair (g, Q) satisfying the following equation for given n and v:

$$Q^v=g^2 \bmod n \quad (3)$$

It can be shown that equation (3) can be solved in a reasonable time only by someone who knows the factors of the modulus, i.e. the keyholder. In other words, calculating a pair of keys conforming to application WO-00/45550 from the corresponding public parameters is just as complicated as factorizing the number n; the two tasks are said to be equivalent in terms of complexity and a set of keys implying this kind of equivalence satisfies the equivalence criterion.

A first advantage of this state of affairs is that there is a reference level of security (i.e. the factorization problem). A second advantage is that a holder of keys according to application WO-00/45550 does not need to have such a public key certified by a certification authority, i.e. to obtain from that authority a certificate linking that public key to the identity of its holder; it is only necessary to certify the RSA modulus n, the other parameters being published directly by the holder. In contrast, in the Fiat-Shamir method, for example, it is possible for different entities to construct their own pairs of keys from the same RSA modulus (Fiat-Shamir pairs therefore do not satisfy the equivalence criterion defined above), and consequently each particular public key must be linked by a certification authority to the identity of its holder.

It can nevertheless be shown that there exist solutions of equation (3) for only certain particular moduluses n (representing about one quarter of all RSA moduluses). This is problematic for an entity seeking to produce pairs of keys according to application WO-00/45550: if that entity already has a collection of RSA moduluses, it can generally use only some of them to construct the keys, whereas if it does not already have any RSA moduluses, it will find it more difficult to find adequate moduluses than if all (or almost all) the RSA moduluses were compatible with the method.

SUMMARY OF THE INVENTION

Thus a first aspect of the present invention relates to an asymmetrical key cryptography method involving a keyholder having a number $m \geq 1$ of private keys $Q_1, Q_2, \ldots, Q_m$ and respective public keys $G_1, G_2, \ldots, G_m$, each pair of keys $(Q_i, G_i)$ where $i=1, \ldots, m$ satisfying either the relationship $G_i=Q_i^v \bmod n$ or the relationship $G_i \times Q_i^v=1 \bmod n$, where n is a public integer equal to the product of f (where f>1) private prime factors $p_1, \ldots, p_f$, at least two of which are separate, and the exponent v is a public integer equal to a power of 2. The method is noteworthy in that $$v=2^{b+k},$$

where k is a strictly positive integer and $b=\max(b_1, \ldots, b_f)$, where $b_j$ (where $j=1, \ldots, f$) is the highest integer such that $(p_j-1)/2^{b_j-1}$ is even, and each public key $G_i$ (where $i=1, \ldots, m$) is of the form $G_i=g_i^{2^{ai}} \bmod n$, where the base numbers $g_i$ are integers strictly greater than 1 and the numbers $a_i$ are integers such that $1 \leq a_i \leq b$ and at least one of them is strictly greater than 1.

Note that the present invention differs from application WO-00/45550 in particular in that each public key is of the form $G_i=g_i^{2^{ai}} \bmod n$, where at least one of the numbers $a_i$ is strictly greater than 1, rather than of the form $G_i=g_i^2 \bmod n$.

As shown in the detailed description given below, by means of these provisions, regardless of the value chosen for the modulus n, and apart from very rare exceptions (these particular moduluses being in practice never chosen for executing the RSA method), keys according to the invention, i.e. key pairs (g, Q) satisfying the conditions briefly stated above, necessarily exist. In other words, the method according to the present invention is compatible with any RSA modulus.

According to a particular feature of the invention, at least one of said prime factors $p_1, \ldots, p_f$ is congruent to 1 modulo 4 and the integers $a_i$ (where $i=1, \ldots, m$) are all equal to said number b.

This considerably facilitates the construction of sets of keys according to the invention.

According to another particular feature of the invention, said base numbers $g_1, \ldots, g_m$ include at least one number $g_s$ and said prime factors $p_1, \ldots, p_f$ include at least two numbers $p_t$ and $p_u$ other than 2 such that, given said numbers $b_1, \ldots, b_f$:

if $b_t=b_u$, then $(g_s|p_t)=-(g_s|p_u)$, and if $b_t<b_u$, then $(g_s|p_u)=-1$, where $(g_s|p_t)$ and $(g_s|p_u)$ denote the Legendre symbols of $g_s$ relative to $p_t$ and $p_u$.

It can be shown that, by means of this feature, the keys obtained satisfy the equivalence criteria defined above.

According to a further particular feature of the invention, said method involves a controller and said keyholder, here called the claimant. The method is noteworthy in that it comprises the following steps:

the claimant chooses at random an integer r, calculates the witness $R=r^v \bmod n$ and sends the witness to the controller, the controller chooses at random m challenges $d_1, d_2, \ldots, d_m$ where $i=1, \ldots, m$ and sends the challenges to the claimant, the claimant calculates the response $$D=r \times Q_1^{d_1} \times Q_2^{d_2} \times \ldots \times Q_m^{d_m} \bmod n,$$

and sends the response to the controller, and the controller calculates $$D^v \times G_1^{\epsilon_1 d_1} \times G_2^{\epsilon_2 d_2} \times \ldots \times G_m^{\epsilon_m d_m} \bmod n$$

where, for $i=1, \ldots, m$, $\epsilon_i=+1$ if $G_i \times Q_i^v=1 \bmod n$ and $\epsilon_i=-1$ if $G_i=Q_i^v \bmod n$, and verifies that the result is equal to the witness R.

It is important to note that it is not necessary for a controller and a claimant that use this method to exchange all of the witness or all of the response: they can, by mutual agreement, exchange only some of the data or the result of applying a predetermined hashing function to some or all of the data.

The execution of the method can advantageously be accelerated by using the Chinese remainder theorem, of course.

For example, to calculate the witness R, the claimant can proceed as follows. For a modulus $n=p_1 \times p_2$, where $p_1<p_2$, let C be the positive number (known as the Chinese remainder) less than $p_1$ such that $p_1$ is a factor of $(p_2 \times C-1)$. The claimant chooses at random two integers $r_1$ and $r_2$ such that $0<r_1<p_1$ and $0<r_2<p_2$ and calculates the two witness components $R_1 = r_1^v \mod p_1$ and $R_2 = r_2^v \mod p_2$. The value of the witness is deduced therefrom as follows, where $z = C \times (R_1 - R_2)$:

$$R = z \times p_2 + R_2$$

The claimant can also use the Chinese remainder theorem to obtain the response D in a similar manner to the calculation technique described above for the Fiat-Shamir method.

Finally, note that the challenges may be limited to challenges satisfying the condition $0 \leq d_i \leq 2^k - 1$ for $i = 1, \ldots, m$ (which has the advantage of simplifying the calculations both for the claimant and for the controller). It is easy to verify that, for two values of $d_i$ differing by $2^k$, the corresponding values of $Q_i^{d_i}$ are deduced from each other by a factor $g_i$. As the publication of the public keys $G_i$ essentially involves the disclosure of the base numbers $g_i$, it is seen that the same level of security is obtained with challenge values in the range $0 \leq d_i \leq 2^k - 1$ as with challenge values outside that range.

According to a further particular feature of the invention, said method enables a controller to verify that a message M that it has received was sent to it by said keyholder, here called the claimant. The method is noteworthy in that it comprises the following steps:

the claimant chooses at random an integer r and first calculates the witness $R = r^v \mod n$, then calculates the token $T = h(M, R)$, where h is a hashing function, and finally sends the token T to the controller, the controller chooses at random m challenges, where $i = 1, \ldots, m$, and sends the challenges to the claimant, the claimant calculates the response $$D = r \times Q_1^{d_1} \times Q_2^{d_2} \times \ldots \times Q_m^{d_m} \mod n,$$

and sends the response to the controller, and the controller calculates $$h(M, D^v \times G_1^{\epsilon_1 d_1} \times G_2^{\epsilon_2 d_2} \times \ldots \times G_m^{\epsilon_m d_m} \mod n)$$

where, for $i = 1, \ldots, m$, $\epsilon_i = +1$ if $G_i \times Q_i^v = 1 \mod n$ and $\epsilon_i = -1$ if $G_i = Q_i^v \mod n$, and verifies that the result is equal to the token T.

The above remark on the values of the challenges in the entity authentication method obviously applies equally to this message authentication method.

Note also that this message authentication procedure is sometimes considered to be a form of message signing.

According to another particular feature of the invention, another way of signing a message, which enables said keyholder, here called the signatory, to sign a message M sent to a controller, is noteworthy in that it comprises the following steps:

the signatory chooses at random m integers $r_i$, where $i = 1, \ldots, m$, and first calculates the witnesses $R_i = r_i^v \mod n$, then calculates the token $T = h(M, R_1, R_2, \ldots, R_m)$, where h is a hashing function producing a word of m bits, and finally sends the token T to the controller, the signatory identifies the bits $d_1, d_2, \ldots, d_m$ of the token T, the signatory calculates the responses $D_i = r_i \times Q_i^{d_i} \mod n$ and sends the responses to the controller, and the controller calculates $$h(M, D_1^v \times G_1^{\epsilon_1 d_1} \mod n, D_2^v \times G_2^{\epsilon_2 d_2} \mod n, \ldots, D_m^v \times G_m^{\epsilon_m d_m} \mod n)$$

where, for $i = 1, \ldots, m$, $\epsilon_i = +1$ if $G_i \times Q_i^v = 1 \mod n$ and $\epsilon_i = -1$ if $G_i = Q_i^v \mod n$, and verifies that the result is equal to the token T.

A second aspect of the invention relates to various devices.

This aspect of the invention relates firstly to an electronic circuit including a processor and memories that is noteworthy in that it can be programmed to act as the keyholder in executing any of the cryptography methods described above.

It relates further to a dedicated electronic circuit that is noteworthy in that it contains data enabling it to act as the keyholder in executing any of the cryptography methods described above. It may in particular be an application-specific integrated circuit (ASIC).

The above two electronic circuits may take the form of an electronic microchip, for example.

The invention also relates, thirdly, to a portable object adapted to be connected to a terminal to exchange data with the terminal and noteworthy in that it contains an electronic circuit as described above and is able to store identification data and private keys specific to said keyholder.

This portable object may be a smart card or a USB key, for example.

The invention also relates, fourthly, to a terminal adapted to be connected to a portable object to exchange data with the portable object and noteworthy in that it includes a data processing device programmed to act as said controller in executing any of the cryptography methods described above.

The invention also relates, fifthly, to a cryptography system comprising a portable object and a terminal both as described above.

The invention also relates, sixthly, to non-removable data storage means containing electronic data processing program code instructions for, as said keyholder, executing the steps of any of the cryptography methods described above.

The invention also relates, seventhly, to partially or totally removable data storage means containing electronic data processing programming code instructions for, as said keyholder, executing steps of any of the cryptography methods described above.

The invention also relates, eighthly, to a data processing device comprising keyholder storage means as described above. This data processing device may be a personal computer or a server, for example.

The invention also relates, ninthly, to non-removable data storage means containing electronic data processing program code instructions for, as said controller, executing the steps of any of the cryptography methods described above.

The invention also relates, tenthly, to partially or totally removable data storage means containing electronic data processing program code instructions for, as said controller, executing the steps of any of the cryptography methods described above.

The invention also relates, eleventhly, to a data processing device comprising controller storage means as described above.

This data processing device may be a personal computer or a server, for example.

The invention also relates, twelfthly, to a cryptography system comprising a keyholder data processing device and a controller data processing device as described above.

The advantages of the above devices are essentially the same as those of the corresponding methods described above.

The invention also provides a computer program containing instructions such that, when said program controls a programmable data processing device, said instructions cause said data processing device to execute one of the cryptography methods described above.

The advantages of this computer program are essentially the same as those of the cryptography methods described above.

Other aspects and advantages of the invention become apparent on reading the following detailed description.

DETAILED DESCRIPTION OF THE EMBODIMENTS

Consider a modulus n that is generally the product of f (where f>1) large prime factors $p_1, \ldots, p_f$ at least two of which are separate, where $p_1 \leq \ldots \leq p_f$ and $p_1 < p_f$:

$$n = p_1 \times \ldots \times p_f$$

Each factor $p_j$, where $j=1, \ldots, f$, may be associated with a strictly positive integer $b_j$ defined in the following manner: $(p_j-1)$ is divisible by $2^{b_j}$, but not by $2^{b_j+1}$ (in other words, $b_j$ is the highest integer such that $(p_j-1)/2^{b_j-1}$ is even). It is easy to verify that $b_j=1$ if $p_j=3 \mod 4$ and $b_j>1$ if $p_j=1 \mod 4$.

If an entity wishes to become a keyholder, it can request a certification authority to assign it an RSA modulus n. The entity then constructs a number $m \geq 1$ of private keys $Q_1, Q_2, \ldots, Q_m$ and publishes said modulus n, an exponent v and respective public keys $G_1, G_2, \ldots, G_m$.

According to the invention, these quantities conform to the following conditions:

the exponent is of the following form, where $b = \max(b_1, \ldots, b_f)$ and $k \geq 1$:

$$v = 2^{b+k},$$

each public key $G_i$ (where $i=1, \ldots, m$) is of the following form, where the base numbers $g_i$ are integers strictly greater than 1 and the numbers $a_i$ are integers such that $1 \leq a_i \leq b$ and such that at least one of them is strictly greater than 1: $G_i = g_i^{2^{a_i}} \mod n$ each pair of keys $(Q_i, G_i)$ (where $i=1, \ldots, m$) satisfies either the relationship $G_i = Q_i^v \mod n$     (1i)

or the relationship $G_i \times Q_i^v = 1 \mod n$     (1'i)

It can be shown that, for pairs of keys satisfying the above conditions to exist, the rank of each key $G_i$ relative to each prime factor $p_j$ must be odd. In this regard, note that "the rank $\lambda$ relative to p" of a non-null element x of the body of integers modulo p (where p is prime) is the smallest strictly positive integer $\lambda$ such that $x^\lambda = 1 \mod p$ (where the successive powers of x are taken modulo p).

The condition whereby the rank of $G_i$ relative to each of the prime factors of the modulus n is odd implies that no prime factor $p_j$ can be such that $(p_j-1)$ is equal to a power of 2; however, the prime numbers satisfying this condition (for example 3, 5, 17, and 257) are rare, and even very rare if large numbers are chosen for the prime factors of the modulus.

This property of public keys can be obtained by choosing the integers $g_i$ and $a_i$ in accordance with the following rule for all $j=1, \ldots, f$:

$$a_i \geq h(g_i) \mod p_j$$

where, for any non-null integer x of the body of integers modulo p (where p is prime), the "height h(x) mod p of x relative to p" is defined as the highest power of 2 that is a factor of the rank of x relative to p.

One particular embodiment of the invention is described next by way of non-limiting example.

In this embodiment, the prime factors $p_j$ of the modulus n are chosen so that at least one of them is congruent to 1 modulo 4 (the other factors can be congruent either to 1 or to 3 modulo 4). It follows from the properties of the associated numbers $b_j$ stated above that:

$$b > 1.$$

Moreover, for all $i=1, \ldots, m$:

$$G_i = g_i^{2^b} \mod n \quad (4)$$

Note that, in contrast, the keys defined by application WO-00/45550 (which satisfy the relationship $Q_i^v = g_i^2 \mod n$, as indicated above) exist only for the moduluses for which all the prime factors are congruent to 3 modulo 4.

It can be shown that the public keys $G_i$ defined by equation (4) are of odd rank relative to each of the prime factors of the modulus.

Finally, there must exist at least one number $g_s$ among said base numbers $g_1, \ldots, g_m$ and two numbers $p_t$ and $p_u$ other than 2 among said prime factors $p_1, \ldots, p_f$ such that if $b_t = b_u$, then $(g_s|p_t) = -(g_s|p_u)$     (5a)

if $b_t < b_u$, then $(g_s|p_u) = -1$,     (5b)

where the numbers $b_t$ and $b_u$ (see above for definitions of these numbers) are determined relative to $p_t$ and $p_u$ and $(g_s|p_t)$ and $(g_s|p_u)$ denote the corresponding Legendre symbols of $g_s$.

In this regard, note that the "Legendre symbol relative to p" $(x|p)$, of a non-null element x of the body of integers modulo p (where p is a prime number other than 2) is equal to $x^{(p-1)/2} \mod p$. It is easily shown that $(x|p)=0$ if x is a multiple of p, $(x|p)=+1$ if x is equal to the square modulo p of another element of the body, and $(x|p)=-1$ otherwise.

The equations (5a-5b) represent an embodiment of the invention in which the keys satisfy the equivalence criteria, i.e. in which it is impossible to calculate the private keys $Q_1, Q_2, \ldots, Q_m$ from public parameters n, v and $G_1, G_2, \ldots, G_m$ in a reasonable time unless the prime factors of the modulus are known.

In contrast, if the factors of the modulus are known, the private keys can be obtained in the following manner. Let A be the lowest common multiple of the numbers $(p_j-1)/2^b$, where $j=1, \ldots, f$, and let u be the smallest positive integer such that $(u \times v+1)$ is a multiple of A. Each private key satisfies:

$Q_i \times G_i^u = 1 \mod n$ if equation (1i) is chosen (i.e. $G_i = Q_i^v \mod n$), or $Q_i = G_i^u \mod n$ if equation (1'i) is chosen (i.e. $G_i \times Q_i^v = 1 \mod n$).

The private keys $Q_1, Q_2, \ldots, Q_m$ can also be calculated using the Chinese remainder theorem.

To finish, a few remarks concerning the base numbers.

It is found that the speed of the calculations effected during the execution of the method according to the invention increases when the base numbers are taken to be smaller. It is therefore recommended that they be chosen to be as small as possible.

For example, the base numbers may be chosen from the first 54 prime numbers (the fifty-fourth prime number being 251).

Alternatively, the first m prime numbers can systematically be taken as base numbers, that is to say $g_1=2$, $g_2=3$, $g_3=5$, $g_4=7$, $g_5=11$, and so on. This approach has the advantage of simplicity, but does not guarantee that a set of keys is obtained satisfying the equivalence criterion. However, it can be shown that the proportion of sets not satisfying the equivalence criterion is less than $\frac{1}{2^m}$; for example, for m=16 (corresponding to $g_{16}=53$), this proportion is less than $\frac{1}{65\,536}$.

The invention claimed is:

1. An asymmetrical key cryptography method involving a processor-implemented keyholder having a number $m \geq 1$ of private keys $Q_1, Q_2, \ldots, Q_m$ and respective public keys $G_1, G_2, \ldots, G_m$, each pair of keys $(Q_i, G_i)$ (where $i=1, \ldots, m$) satisfying either the relationship $G_i = Q_i^v \mod n$ or the relationship $G_i \times Q_i^v = 1 \mod n$, where n is a public integer equal to the product of f(where f>1) private prime factors $p_1, \ldots, p_f$, at least two of which are separate, and the exponent v is a public integer equal to a power of 2, wherein the method comprises:

arranging, by a processor, exponent v to have the relationship $v = 2^{b+k}$, where k is a strictly positive integer and $b = \max(b_1, \ldots, b_f)$, where $b_j$ (where $j=1, \ldots, f$) is the highest integer such that $(p_j-1)/2^{bj-1}$ is even; and arranging, by the processor each public key $G_i$ (where $i=1, \ldots, m$) to have the form $G_i = g_i^{2^{a_i}} \mod n$, where the base numbers $g_i$ are integers strictly greater than 1 and the numbers $a_i$, are integers such that $1 \leq a_i \leq b$ and at least one of them is strictly greater than 1.

2. A method according to claim 1, wherein at least one of said prime factors $p_1, \ldots, p_f$ is congruent to 1 modulo 4 and the integers $a_i$ (where $i=1, \ldots, m$) are all equal to said number b.

3. A method according to claim 1, wherein said base numbers $g_1, \ldots, g_m$ include at least one number $g_s$, and said prime factors $p_1, \ldots, p_f$ include at least two numbers $p_t$ and $p_u$ other than 2 such that, given said numbers $b_1, \ldots, b_f$, if $b_t = b_u$, then $(g_s*p_t) = -(g_s*p_u)$, and if $b_t < b_u$, then $(g_s*p_u) = -1$, where $(g_s*p_t)$ and $(g_s*p_u)$ denote the Legendre symbols of $g_s$ relative to $p_t$ and $p_u$.

4. A method according to claim 1, wherein the base numbers $g_i, \ldots, g_m$ are prime numbers.

5. A method according to claim 1, involving a processor-implemented controller and said processor-implemented keyholder, here called the process-implemented claimant, wherein the method comprises:

the processor-implemented claimant chooses at random an integer r, calculates the witness $R = r^v \mod n$ and sends the witness to the processor-implemented controller, the processor-implemented controller chooses at random m challenges $d_1, d_2, \ldots, d_m$ and sends the challenges to the processor-implemented claimant, the processor-implemented claimant calculates the response $$D = r \times Q_1^{d_1} \times Q_2^{d_2} \times \ldots \times Q_m^{d_m} \mod n,$$

and sends the response to the processor-implemented controller, and the processor-implemented controller calculates $$D^v \times G_1^{\epsilon_1 d_1} \times G_2^{\epsilon_2 d_2} \times \ldots \times G_m^{\epsilon_m d_m} \mod n$$

where, for $i=1, \ldots, m$, $\epsilon_i = +1$ if $G_i \times Q_i^v = 1 \mod n$ and $\epsilon_i = -1$ if $G_i = Q_i^v \mod n$, and verifies that the result is equal to the witness R.

6. A method according to claim 1, enabling a processor-implemented controller to verify that a message M that it has received was sent to it by said processor-implemented keyholder, here called the processor-implemented claimant, wherein the method comprises:

the processor-implemented claimant chooses at random an integer r and first calculates the witness $R = r^v \mod n$, then calculates the token $T = h(M, R)$, where h is a hashing function, and finally sends the token T to the processor-implemented controller, the processor-implemented controller chooses at random in challenges $d_1, d_2, \ldots, d_m$, and sends the challenges to the processor-implemented claimant, the processor-implemented claimant calculates the response $$D = r \times Q_1^{d_1} \times Q_2^{d_2} \times \ldots \times Q_m^{d_m} \mod n$$

and sends the response to the controller, and the processor-implemented controller calculates $h(M, D^v \times G_1^{\epsilon_1 d_1} \times G_2^{\epsilon_2 d_2} \times \ldots \times G_m^{\epsilon_m d_m} \mod n)$ where, for $i=1, \ldots, m$, $\epsilon_i = +1$ if $G_i \times Q_i^v = 1 \mod n$ and $\epsilon_i = -1$ if $G_i \times Q_i^v \mod n$, and verifies that the result is equal to the token T.

7. A method according to claim 5, wherein the challenges satisfy the condition $0 \leq d_i \leq 2^k - 1$ for $i=1, \ldots, m$.

8. A method according to claim 1, enabling said processor-implemented keyholder, here called the signatory, to sign a message M that it sends to a processor-implemented controller, wherein the method comprises:

the processor-implemented signatory chooses at random in integers $r_i$, where $i=1, \ldots, m$, and first calculates the witnesses $R_i = r_i^v \mod n$, then calculates the token $T = h(M, R_1, R_2, \ldots, R_m)$, where h is a hashing function producing a word of in bits, and finally sends the token T to the controller, the processor-implemented signatory identifies the bits $d_1, d_2, \ldots, d_m$ of the token T, the processor-implemented signatory calculates the responses $D_i = r_i \times Q_i^{d_i} \mod n$ and sends the responses to the processor-implemented controller, and the processor-implemented controller calculates $$h(M, D_1^v \times G_1^{\epsilon_1 d_1} \mod n, D_2^v \times G_2^{\epsilon_2 d_2} \mod n, \ldots, D_m^v \times G_m^{\epsilon_m d_m} \mod n)$$

where, for $i=1, \ldots, m$, $\epsilon_i = +1$ if $G_i \times Q_i^v = 1 \mod n$ and $\epsilon_i = -1$ if $G_i \times Q_i^v \mod n$, and verifies that the result is equal to the token T.

9. An electronic circuit including a processor and memories, wherein the electronic circuit is programmed to act as said processor-implemented keyholder in executing the method according to claim 1.

10. A dedicated electronic circuit, including microcomponents enabling the electronic circuit to process data in such manner as to act as said processor-implemented keyholder in executing the method according to claim 1.

11. A portable object adapted to be connected to a terminal to exchange data with that terminal, wherein the portable object includes an electronic circuit according to claim 9 or claim 10 and is adapted to store identification data and private keys specific to said processor-implemented key holder.

12. A terminal adapted to be connected to a portable object to exchange data with that portable object, wherein the terminal includes a data processing device programmed to act as said processor-implemented controller in executing a method according to any one of claims 5-8.

13. A cryptography system comprising:

a portable object adapted to be connected to a terminal to exchange data with that terminal, wherein the portable object includes an electronic circuit, wherein the electronic circuit is programmed to act as said processor-implemented keyholder in executing an asymmetrical key cryptography method involving the processor-implemented keyholder having a number $m \geq 1$ of private keys $Q_1, Q_2, \ldots, Q_m$ and respective public keys $G_1, G_2, \ldots, G_m$, each pair of keys $(Q_i, G_i)$ (where $i=1, \ldots, m$) satisfying either the relationship $G_i = Q_i^v \mod n$ or the relationship $G_i \times Q_i^v = 1 \mod n$ where n is a public integer equal to the product of f (where f>1) private prime factors $p_1, \ldots, p_f$, at least two of which are separate, and the exponent v is a public integer equal to a power of 2, wherein the method comprises:

arranging, by the processor, exponent v to have the relationship $v=2^{b+k}$, where k is a strictly positive integer and $b=\max(b_1, \ldots, b_f)$, where $b_j$ (where $j=1, \ldots, f$) is the highest integer such that $(p_j-1)/2^{b_j-1}$ is even; and arranging, by the processor, each public key $G_i$ (where $i=1, \ldots, m$) to have the form $G_i=g_i^{2^{a_i}} \bmod n$, where the base numbers $g_i$ are integers strictly greater than 1 and the numbers $a_i$ are integers such that $1 \leq a_i \leq b$ and at least one of them is strictly greater than 1, and wherein the portable object is adapted to store identification data and private keys specific to said processor-implemented keyholder; and a terminal adapted to be connected to the portable object to exchange data with that portable object, wherein the terminal includes a data processing device programmed to act as said processor-implemented controller in executing a method according to any one of claims 5-8 claim 6.

14. Non-removable data storage means containing electronic data processing program code instructions for, as said processor-implemented keyholder, executing the method according to claim 1.

15. Partially or totally removable storage means containing electronic data processing program code instructions for, as said processor-implemented keyholder, executing the method according to claim 1.

16. A data processing device comprising storage means according to claim 14 or claim 15.

17. Non-removable, partially removable, or totally removable data storage means containing electronic data processing program code instructions for, as said processor-implemented controller, executing the method according to any one of claims 5-8.

18. A data processing device, wherein it comprises storage means according to claim 17.

19. A cryptography system comprising:

a data processing device including storage means containing electronic data processing program code instructions for, as said processor-implemented keyholder, executing an asymmetrical key cryptography method involving the processor-implemented keyholder having a number $m \geq 1$ of private keys $Q_1, Q_2, \ldots, Q_m$ and respective public keys $G_1, G_2, \ldots, G_m$, each pair of keys $(Q_i, G_i)$ (where $i=1, \ldots, m$) satisfying either the relationship $G_i = Q_i^v \bmod n$ or the relationship $G_i \times Q_i^v = 1 \bmod n$, where n is a public integer equal to the product of f (where $f>1$) private prime factors $p_1, \ldots, p_f$, at least two of which are separate, and the exponent v is a public integer equal to a power of 2, wherein the method comprises:

arranging, by processor, exponent v to have the relationship $v=2^{b+k}$, where k is a strictly positive integer and $b=\max(b_1, \ldots, b_f)$, where $b_j$ (where $j=1, \ldots, f$) is the highest integer such that $(p_j-1)/2^{b_j-1}$ is even; and arranging, by processor, each public key $G_i$ (where $i=1, \ldots, m$ to have the form $G_i=g_i^{2^{a_i}} \bmod n$, where the base numbers $g_1$ are integers strictly greater than 1 and the numbers $a_i$ are integers such that $1 \leq a_i \leq b$ and at least one of them is strictly greater than 1; and a data processing device including data storage means containing electronic data processing program code instructions for, as said processor-implemented controller, executing the method according to any one of claims 5-8.

20. A method according to claim 4, wherein the base numbers $g_1, \ldots, g_m$ are chosen from the first 54 prime numbers.

* * * * *

UNITED STATES PATENT AND TRADEMARK OFFICE
CERTIFICATE OF CORRECTION

| | | |
|---|---|---|
| PATENT NO. | : 7,680,271 B2 | |
| APPLICATION NO. | : 10/587460 | |
| DATED | : March 16, 2010 | |
| INVENTOR(S) | : Louis Guillou and Jean-Jaques Quisquater | |

It is certified that error appears in the above-identified patent and that said Letters Patent is hereby corrected as shown below:

Column 11, Line 66, "in challenges $d_1, d_2,...,d_m$," should read --m challenges $d_1, d_2,...,d_m$--

Column 12, Line 4, "to the controller, and" should read --to the processor-implemented controller, and--

Column 12, Line 15, "chooses at random in integers" should read --chooses at random m integers--

Column 12, Line 19, "producing a word of in bits" should read --producing a word of m bits--

Column 12, Line 63, "or the relationship $G_i \times Q_{iv} = 1 \mod n$" should read --or the relationship $G_i \times Q_{iv} = 1 \mod n$,--

Column 13, Line 18, "to any of claims 5-8 claim 6" should read --to claim 6--

Column 14, Line 17, "arranging, by processor," should read --arranging, by the processor--

Column 14, Line 22, "arranging by processor, each public key $G_i$ (where i = 1,...,m to" should read --arranging by the processor, each public key $G_i$ (where i = 1,...,m) to--

Signed and Sealed this
Twenty-second Day of February, 2011

David J. Kappos
*Director of the United States Patent and Trademark Office*